(12) United States Patent
Hamby et al.

(10) Patent No.: US 8,323,793 B2
(45) Date of Patent: Dec. 4, 2012

(54) PELLETIZATION OF PYROLYZED RUBBER PRODUCTS

(75) Inventors: Kenneth W. Hamby, The Woodlands, TX (US); Michael R. Beck, Jr., Akron, OH (US)

(73) Assignee: Tellus Technology, Inc., San Diego, CA (US)

( * ) Notice: Subject to any disclaimer, the term of this patent is extended or adjusted under 35 U.S.C. 154(b) by 744 days.

(21) Appl. No.: 12/121,339

(22) Filed: May 15, 2008

(65) Prior Publication Data

US 2008/0286574 A1 Nov. 20, 2008

Related U.S. Application Data

(60) Provisional application No. 60/938,480, filed on May 17, 2007.

(51) Int. Cl.
*B32B 27/02* (2006.01)
*C01D 3/00* (2006.01)
*B29C 67/02* (2006.01)
*B22F 3/00* (2006.01)

(52) U.S. Cl. .......... 428/402; 423/449.1; 423/449.8; 425/222

(58) Field of Classification Search .............. None
See application file for complete search history.

(56) References Cited

U.S. PATENT DOCUMENTS

| | | | |
|---|---|---|---|
| 2,511,088 A * | 6/1950 | Whaley, Jr ............. 23/314 |
| 3,282,719 A * | 11/1966 | Voet ..................... 106/477 |
| 3,671,613 A | 6/1972 | Gotshall |
| 4,203,804 A | 5/1980 | Janning et al. |
| 4,250,158 A * | 2/1981 | Solbakken et al. ........ 423/449.6 |
| 4,284,616 A | 8/1981 | Solbakken et al. |
| 4,647,443 A | 3/1987 | Apffel |
| 4,648,328 A | 3/1987 | Keough |
| 5,037,628 A | 8/1991 | Fader |
| 5,087,436 A | 2/1992 | Roy |
| 5,099,086 A | 3/1992 | Roy |
| 5,208,401 A | 5/1993 | Roy |
| 5,229,099 A | 7/1993 | Roy |
| 5,230,777 A | 7/1993 | Jarrell |
| 5,449,438 A | 9/1995 | Jagau et al. |
| 5,451,297 A | 9/1995 | Roy |
| 5,464,503 A | 11/1995 | Avetisian et al. |
| 5,550,312 A | 8/1996 | Schingnitz et al. |
| 5,654,357 A | 8/1997 | Menashi et al. |

(Continued)

OTHER PUBLICATIONS

Barbooti, M.M., Mohamed, T.J., Hussain, A.A., Abas, F.O. "Optimization of pyrolysis conditions of scrap tires under inert gas atmosphere." J. Anal. Appl. Pyrolysis 72 (2004): 165-170.*

(Continued)

*Primary Examiner* — Humera Sheikh
*Assistant Examiner* — Thomas Mangohig
(74) *Attorney, Agent, or Firm* — Fraser Clemens Martin & Miller LLC; Jacob M. Ward

(57) ABSTRACT

A system and method for preparing a pelletized carbon black product is provided. The system includes a source of a carbon black product from a pyrolysis process. A mixer is in communication with the source of the carbon black product. A binder oil storage tank is in fluid communication with the mixer. The binder oil storage tank is configured to inject a desired amount of a binder oil into the mixer to form the pelletized carbon black product.

9 Claims, 1 Drawing Sheet

U.S. PATENT DOCUMENTS

| | | |
|---|---|---|
| 5,744,668 A | 4/1998 | Zhou et al. |
| 5,783,046 A | 7/1998 | Flanigan |
| 5,821,396 A | 10/1998 | Bouziane |
| 5,853,687 A | 12/1998 | Morlec et al. |
| 5,894,012 A | 4/1999 | Denison |
| 6,271,427 B1 | 8/2001 | Ershag |
| 6,372,948 B1 | 4/2002 | Flanigan |
| 6,659,025 B2 | 12/2003 | Yu |
| 6,736,940 B2 | 5/2004 | Masemore et al. |
| 6,835,861 B2 | 12/2004 | Nichols et al. |
| 7,037,410 B2 | 5/2006 | Flanigan |
| 7,101,463 B1 | 9/2006 | Weinecke et al. |
| 7,341,646 B2 | 3/2008 | Nichols et al. |
| 2002/0112646 A1 | 8/2002 | Otto et al. |
| 2002/0117388 A1 | 8/2002 | Denison |
| 2002/0119089 A1* | 8/2002 | Masemore et al. ........ 423/449.7 |
| 2003/0009067 A1 | 1/2003 | Bouziane et al. |
| 2003/0143151 A1 | 7/2003 | Diener et al. |
| 2004/0204620 A1 | 10/2004 | Grispin |
| 2004/0219363 A1 | 11/2004 | Schuch et al. |
| 2005/0023124 A1 | 2/2005 | Karpetsky et al. |
| 2005/0165262 A1 | 7/2005 | Nichols et al. |
| 2006/0099330 A1* | 5/2006 | Nakamura et al. ............ 427/115 |
| 2006/0163053 A1 | 7/2006 | Ershag |
| 2007/0286779 A1 | 12/2007 | Steinmeyer et al. |

OTHER PUBLICATIONS

Roy, C., Chaala, A., Darmstadt, H. "The vacuum pyrolysis of used tires End-uses for oil and carbon black prducts." J. Anal. Appl. Pyrolysis 51 (1999): 201-221.*

ASTM Standard D3191-10, 2010, "Standard Test Methods for Carbon Black in SBR (Styrene-Butadiene Rubber)—Recipie and Evaluation Procedures," ASTM International, West Conshohocken, PA, 2010.*

* cited by examiner

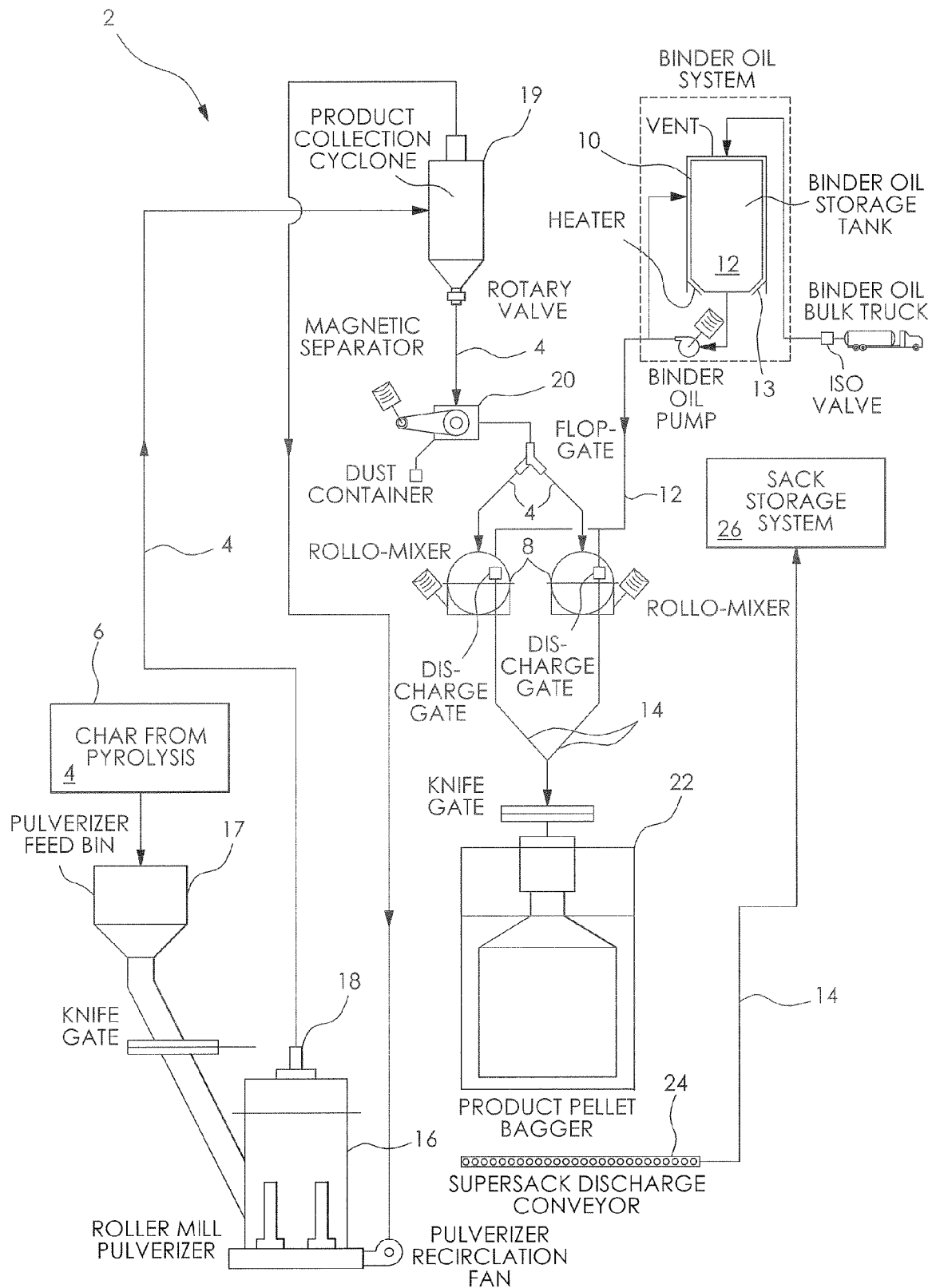

PELLETIZATION OF PYROLYZED RUBBER PRODUCTS

CROSS-REFERENCE TO RELATED APPLICATIONS

This application claims priority to U.S. Provisional Patent Application No. 60/938,480, filed May 17, 2007, the disclosure of which is hereby incorporated herein by reference in its entirety.

FIELD OF THE INVENTION

The present disclosure relates to waste recycling and, more particularly, to processes for pelletizing carbon black products produced by pyrolysis of waste materials.

BACKGROUND OF THE INVENTION

The U.S. Environmental Protection Agency (EPA) estimates that approximately 250 million scrap tires are generated in the United States each year. In the United States alone, the Rubber Manufacturers Association (RMA) has estimated that between two and three billion scrap tires currently reside in landfills or are otherwise stockpiled. Waste tires take up a significant amount of space in landfills, and burying of the tires can lead to landfill contamination, Stockpiling waste tires provides breeding grounds for pests and represents a significant fire hazard. Burning of tires causes a significant amount of air pollution, and run-off from tire fires can contaminate ground water. The handling and disposal of waste tires is a significant environmental problem, and the desirability of recycling waste is evident.

One method of recycling waste tires is pyrolysis. Known tire pyrolysis processes include heating tires to produce useful products such as oils, gases, recyclable metals, and carbonaceous char. As disclosed in U.S. Pat. Nos. 5,783,046, 6,372,948, and 7,037,410 to Flanigan, the entire disclosures of which are hereby incorporated herein by reference, a known pyrolysis process includes heating rubber in the substantial absence of oxygen to a temperature sufficient to pyrolyze the rubber, distilling a vapor comprising hydrocarbon from the rubber, and producing a solid carbonaceous char. Weinecke et al. in U.S. Pat. No. 7,101,463, hereby incorporated herein by reference in its entirety, describes a system and process for the recovery of oil from shredded vehicle tires that utilizes a pair of sequentially positioned packed towers. Also disclosed in U.S. Pat. No. 5,894,012 to Denison, hereby incorporated herein by reference in its entirety, is a waste processing system that produces clear and colorless oil for use in rubber and plastic applications and a carbonaceous char equivalent to a low structure furnace black.

The carbonaceous char produced from typical pyrolysis processes is generally a friable material. The carbonaceous char can be reduced to finely-divided particles or "fluff" form through known pulverization techniques. However, a mixing and dispersion of finely-divided particles of carbonaceous char into rubber and plastics is known to be problematic.

A variety of methods for converting individual particles of carbon black into pellets for improved mixing and dispersion are known to the art. For example, a finely-divided carbon black may be agitated under dry conditions in such a manner as to reduce the quantity of air or other gases associated with the carbon black and cause a degree of agglomeration of the discrete particles of the carbon black. Under wet conditions, the finely-divided carbon black may be agitated in a wet pelletizer in the presence of sufficient liquid pelletizing medium, such as water or a dilute aqueous solution of a binder such as sugar, molasses, dextrin, starch, calcium lignin sulfonate, and the like, to permit agglomeration of the individual particles into free-flowing pellets of suitable structural strength and stability. However, the application of standard carbon black dry and wet pelletization techniques to carbonaceous char from pyrolysis processes has not provided a desirable pelletization quality.

There is a continuing need for a system and method of converting a carbonaceous char from a pyrolysis process to a free-flowing pelletized form in order to permit inexpensive and convenient handling, storing and shipping thereof. Desirably, a carbon black product produced from the carbonaceous char is provided in a form convenient for use by manufacturers of rubber, plastics, and other commercial products.

SUMMARY OF THE INVENTION

In concordance with the instant disclosure, a system and method of converting a carbonaceous char from a pyrolysis process to a free-flowing pelletized form in order to permit inexpensive and convenient handling, storing and shipping thereof, and a carbon black product produced from the carbonaceous char in a form convenient for use by manufacturers of rubber, plastics, and other commercial products, is surprisingly discovered.

In one embodiment, a system for preparing a pelletized carbon black product includes a mixer in communication with a source of carbon black product, such as a carbonaceous char. The mixer is configured to receive the carbon black product. The system also includes a binder oil storage tank in fluid communication with the mixer. The binder oil storage tank is configured to inject a desired amount of a binder oil into the mixer with the carbon black product to pelletize the carbon black product.

In a further embodiment, a method for preparing a pelletized carbon black product comprises the steps of: providing a carbon black product; supplying the carbon black product to a mixer; injecting a binder oil into the mixer in a desired amount; and mixing the carbon black product and the binder oil, wherein the pelletized carbon black product is formed.

In another embodiment, a pelletized carbon black product includes a carbon black product in an amount greater than about 85 percent by weight relative to the total weight of the pelletized carbon black product. The carbon black product includes a carbon black in an amount between about 65 percent and about 98 percent, an organic volatile material in an amount between about 1 percent and about 20 percent, and an inorganic ash in an amount in an amount up to about 15 percent. All percentages are by weight relative to the total weight of the carbon black product. The pelletized carbon black product further includes a binder oil in an amount sufficient to agglomerate the carbon black product into substantially free-flowing pellets.

DRAWINGS

The above, as well as other advantages of the present disclosure, will become readily apparent to those skilled in the art from the following detailed description, particularly when considered in the light of the drawing described hereafter.

The drawing is a process flow diagram depicting a system for pelletizing a carbonaceous char from a pyrolysis process.

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical.

The present disclosure includes a system 2 and method for pelletizing a carbon black product 4 formed from a carbonaceous char produced by pyrolysis of whole tires, tire shreds, waste feedstocks, waste plastic feedstocks, medical waste, and the like. An exemplary pyrolysis process is disclosed in Assignee's copending U.S. application Ser. No. 12/121,139, filed May 15, 2008, hereby incorporated herein by reference in its entirety. The pyrolysis process is conducted according to a time-temperature profile that does not exceed a temperature of about 870° F. A skilled artisan should understand that temperatures substantially higher than this may result in a graphitization of carbonaceous solids produced during the pyrolysis process. A skilled artisan should also understand, however, that the present system 2 and method may be employed with the carbon black product 4 produced by another pyrolysis system and process, as desired.

As shown in the drawing, the system 2 includes a source 6 of the carbon black product 4. The source 6 may be a post-pyrolysis processing system configured to separate a quantity of extraneous materials, such as fiberglass and metals, from the carbon black product 4 following pyrolysis of the waste, for example. A mixer 8 is in communication with the source 6 of carbon black product 4. The mixer 8 is configured to selectively receive the carbon black product 4 from the source 6, as desired.

The system 2 further includes a binder oil storage tank 10 in fluid communication with the mixer 8. The binder oil storage tank 10 is configured to selectively inject a desired amount of a binder oil 12 into the mixer 8 when the carbon black product 4 is disposed therein. The binder oil tank 10 may have at least one heater 13 coupled thereto for heating the binder oil 12 to a desired temperature. It should be understood that the agitation and mixing of the carbon black product 4 and the binder oil 12 by the mixer 8 is sufficient to form a pelletized carbon black product 14 according to the present disclosure.

In certain embodiments, the mixer 8 is one of a batch drum mixer and a rollo-mixer, for example. It should be understood that more than one mixer 8 may be employed in the system 2. The mixer 8 generally is employed to admix the carbon black product 4 and the binder oil 12 and cause the carbon black product 4 to agglomerate into the pelletized carbon black product 14. The mixer 8 may rotate at a rate of up to about 500 RPM, for example. In another example, the mixer 8 is heated to a temperature from about 40° F. to about 200° F. to facilitate the admixing of the carbon black product 4 with the binder oil 12. A skilled artisan should appreciate that other suitable mixers and mixer parameters may be employed as desired.

In particular embodiments, the system 2 further includes a pulverizer 16. The pulverizer 16 is configured to reduce the carbon black product 4 to a desired particle size. For example, the pulverizer 16 may reduce the carbon black product 4 to about 325 mesh particles. The average particle size of the carbon black product 4 may be about five microns, although it should be appreciated that a range of particle sizes may be produced as desired. In particular, favorable results have been obtained when up to 99.99% of the pulverized carbon black product 4 passes through a 325 mesh screen. As a nonlimiting example, the pulverizer 16 is a roller mill pulverizer. Other suitable pulverizers 16 may also be employed.

The pulverizer 16 is disposed between the source 6 of the carbon black product 4 and the mixer 8. The pulverizer 16 is configured to pulverize the carbon black product 4, generally provided as large friable portions from the pyrolysis process, to the desired particle size. The pulverizer 16 may have a pulverizer feed bin 17, for example, which is adapted to selectivity feed the carbon black product 4 to the pulverizer 16. The carbon black product 4 may be gravity fed to the pulverizer 16 from the pulverizer feed bin 17. In other embodiments, the carbon black product 4 is fed to the pulverizer 16 by a mechanized means, such as a moving belt, screw, or the like.

The pulverizer 16 is further in communication with the mixer 8 and configured to provide the pulverized carbon black product 4 to the mixer 8 as desired. The carbon black product 4, when pulverized, may be pneumatically transferable by air conveyance, for example, in conjunction with an air compression system (not shown). A skilled artisan should understand that other means for transferring the carbon black product 4 through the system 2 may also be employed.

In a further embodiment, the system 2 includes a classifier 18. The classifier 18 is configured to selectively provide the carbon black product 4 of the desired particle size to the mixer 8, as desired. The classifier 18 is disposed between the pulverizer 16 and the mixer 8. The classifier 18 may be employed to separate extraneous material, such as fiberglass, from the carbon black product 4. The classifier 18 may be an air classification unit, for example. A commercially available air classification unit designed for operation at rotor speeds from about 400 RPM to about 2,000 RPM is the MICRO-SIZER™ air classification system, manufactured by Progressive Industries, Inc. of Sylacauga, Alabama. One of ordinary skill should appreciate that other classifiers 18 may also be used.

It should be appreciated that the carbon black product 4, following pulverization, may be collected and stored in a collection unit 19 for batch production of the pelletized carbon black product 14. As a nonlimiting example, the collection unit 19 may be a product collection cyclone or centrifugal collector as is known in the art. The product collection cyclone may use cyclonic action to separate the carbon black product 4 from an air carrier stream, for example. The centrifugal force created by cyclonic action throws the carbon black product 4 toward the wall of the product collection cyclone. After striking the wall, carbon black product 4 falls into a hopper located underneath the area of cyclonic action. It should be further understood that other suitable collection units 19 may also be employed.

The system 2 according to the present disclosure may further include a magnetic separator 20 configured to separate extraneous ferrous material from the carbon black product 4. As a nonlimiting example, the pulverized carbon black product 4 may be metered over the magnetic separator 20 to remove recyclable metal, such as steel belt wire from tires employed in the pyrolysis process, prior to the pelletization of the carbon black product 4. In particular embodiments, the magnetic separator 20 is a rotating magnetic drum. The magnetic separator 20 is disposed between the source 6 of carbon black product 4 and the mixer 8. The magnetic separator 20 may provide a substantially metal-free carbon black product 4 for delivery to the mixer 8.

The system 2 may further include a pellet bagger 22 as is known in the art. The pellet bagger 22 is in communication with the mixer 8. The pellet bagger 22 is configured to bag the pelletized carbon black product 14 produced by the mixer 8 for at least one of handling, storing and shipping. As a nonlimiting example, the pellet bagger 22 is configured to fill a supersack with the pelletized carbon black product 14. The pellet bagger 22 is in communication with a discharge conveyor 24 that delivers the bagged pelletized carbon black 14 to a storage system 26 for storing the pelletized carbon black 14 prior to an end use. Other suitable containers for handling, storing, and shipping the pelletized carbon black product 14 may also be filled. In one alternative embodiment, the system 2 may be adapted to feed the pelletized carbon black 14 directly to a rail car or container, for example, as desired.

The present disclosure further includes a method for preparing the pelletized carbon black product 14. The method includes the steps of providing the carbon black product 4 and supplying the carbon black product 4 to the mixer 8. The binder oil 12 is injected into the mixer 8 in a desired amount. The carbon black product 4 and the binder oil 12 are admixed to thereby form the pelletized carbon black product 14.

As described hereinabove, the carbon black product 4 is typically a carbonaceous char produced during pyrolysis of a waste material, such as waste tires. In a particular embodiment, the carbon black product 4 is provided by a pyrolysis process as disclosed in Assignee's copending U.S. application Ser. No. 12/121,139. For example, the pyrolysis process includes the step of depositing a quantity of waste into a porous container, the porous container adapted to allow at least one convective stream of substantially anaerobic gas to flow therethrough. The porous container is inserted into a pyrolysis thermal processor. The thermal processor is sealed and at least one convective stream is circulated therethrough. The waste is heated with the convective stream of gas according to a time-temperature profile to pyrolyze the waste and produce the carbon black product 4. The convective stream of gas is then circulated through a cooler to cool the carbon black product 4. The carbon black product 4 is subsequently collected for pelletization in the mixer 8.

The method further includes the step of pulverizing the carbon black product 4 to a desired particle size prior to supplying the carbon black product 4 to the mixer 8. As described hereinabove, a quantity of extraneous material may also be separated from the carbon black product 4 with at least one of the classifier 18 and the magnetic separator 20 prior to supplying the carbon black product 4 to the mixer 8. In a particular embodiment, the separation includes magnetically separating the quantity of ferrous material from the carbon black product 4 to provide the substantially metal-free carbon black product 4.

The admixing of the carbon black product 4 and the binder oil 12 according to the method of the present disclosure produces the pelletized carbon black product 14. It should be appreciated that the carbon black of the carbon black product 4 includes a substantially amorphous carbon. The carbon black product 4 may include carbon black in an amount between about 65 percent and about 98 percent. The carbon black product 4 further includes an organic volatile material in an amount between about 1 percent and about 20 percent. The carbon black product 4 also includes an inorganic ash in an amount up to about 15 percent. All percentages are by weight relative to the total weight of the carbon black product 4. The inorganic ash may include elemental zinc from zinc oxides originally used in the waste rubber as an activator, and inorganic fillers employed in the waste rubber, such as silica and clays, for example. In certain embodiments, the inorganic ash may include a quantity of elemental sulfur, for example, that was employed to originally vulcanize waste rubber.

As a further nonlimiting example, the carbon black product 4 may include between about 85 percent and about 95 percent carbon black and about 5 percent to about 15 percent residual volatiles in the form of residual polymer and hydrocarbons remaining at the end of the pyrolysis process. The carbon black product 4 also may include an inorganic ash in an amount up to about 9 percent to about 12 percent. It is surprisingly found that the residual volatiles advantageously minimize dusting of the pelletized carbon black product 14 and facilitate dispersion and miscibility of the pelletized carbon black product 14 in elastomer and oil applications.

The pelletized carbon black product 14 has the binder oil 12 in an amount sufficient to provide a pelletized carbon black product 14 with a pellet hardness and fines content suitable for use in rubber mixing, for example. Pellets must have a sufficient strength to resist physical break down during transportation, but also facilitate dispersion in rubber and plastic compounds. Fines are considered an indicator of bulk handling and rubber and plastic mixing difficulties. As the binder employed to pelletize the carbon black product 4 is an oil, it should be appreciated that the pelletized carbon black product 14 is substantially non-dusting and may have minimal fines content. The amount of the binder oil 12 may be selected to provide a desirable fines content and level of non-dusting as desired.

As a nonlimiting example, the binder oil 12 may be used in an amount up to about 15 percent by weight relative to the total weight of the pelletized carbon black product 14. In particular embodiments, the binder oil 12 in an amount of about 12.5 percent by weight relative to the total weight of the pelletized carbon black product 14 is sufficient to form pellets with the desired characteristics. As nonlimiting examples, the binder oil 12 is at least one of a highly aromatic oil, a naphthenic oil, and a paraffinic oil. It should be appreciated that product oil derived from the pyrolysis process may also be used as a binder oil 12. The product oil has an iron content and a zinc content due to the presence of steel belt wire and zinc oxide in the at least one of whole tires and tire shreds from which the product oil is derived. A skilled artisan may select other suitable binder oils 12 and levels as desired.

Individual pellets of the pelletized carbon black product may have an average diameter from about 0.125 inches to about 0.0625 inches, for example. In other embodiments, the pellets produced according to the present method may fall within a desired range of about 18 to about 60 mesh, for example. The individual pellets of the pelletized carbon black product 14 may be substantially spherical, although one of ordinary skill in the art should understand that the pelletized carbon black product 14 may be provided other shapes that facilitate flowability of the pelletized carbon black product 14. The pelletization process minimizes product dusting, and improves density and flow properties associated with the carbon black product 4 produced by pyrolysis of waste. The pelletized carbon black product 14 may then be stored, for example, in a silo, supersack or in small bags for delivery and the desired end use.

It should be appreciated that the pelletized carbon black product 14 according to the present disclosure provides for an optimized dispersion and miscibility of the carbon black product 4 in rubber and plastic compounds, particularly in comparison to known pyrolysis products provided in fluff form. It is surprisingly found that the use of the binder oil 12, in conjunction with the residual volatiles of the pelletized carbon black product 4, advantageously minimizes dusting of the pelletized carbon black product 14.

EXAMPLES

As may be observed in Table 1, the carbon black product manufactured according to the present disclosure was analyzed and further tested in an ASTM standard rubber formulation. ASTM testing methods known in the art were employed in evaluating the carbon black product.

TABLE I

| Property | ASTM Method | Average | High | Low |
|---|---|---|---|---|
| Specific Gravity | D297 | 1.84 | 1.81 | 1.86 |
| Moisture pelletized (%) | D297 | 0.5 | 2 | 0.1 |
| Tensile (psi) | D3191 | 3000 | 3500 | 2800 |
| Ash (%) | D297 | 10 | 14 | 5 |
| Sieve Residue | | | | |
| 325 mesh (ppm) | D1514 | 200 | 1000 | — |
| 35 mesh (ppm) | D1514 | 0 | 10 | — |

The carbon black product was in the form of a solid or friable black material having a specific gravity of about 1.81 to about 1.86, with an average specific gravity of about 1.81. The carbon black product further had an average moisture content of about 0.5 percent, with a range of moisture content between about 0.1 percent and about 2 percent. The average ash content of the carbon black product was also between about 5 percent and about 14 percent, with an average ash content of about 10 percent by weight of the carbon black product. The specific gravity, moisture, and ash contents were tested according to ASTM D297. ASTM D297 describes standard test methods for rubber products, including chemical analysis of rubber products The carbon black product was mixed into a rubber formulation according to ASTM D3191, titled Standard Test Methods for Carbon Black in SBR (Styrene-Butadiene Rubber)—Recipe and Evaluation Procedures. Tensile testing of the standard SBR formulation with the carbon black product yielded an average tensile strength of about 3000 psi, and a range of tensile strength values between about 2800 psi and about 3500 psi.

The carbon black product was further evaluated according to ASTM D1514 for sieve residue. With a 325 mesh screen, the carbon black product had an average sieve residue of about 200 ppm and a maximum sieve residue of about 1000 ppm. The residue on the 325 mesh screen was observed to be non-crushable carbon black product. With a 35 mesh screen, a maximum sieve residue of about 10 ppm was observed.

While certain representative embodiments and details have been shown for purposes of illustrating the invention, it will be apparent to those skilled in the art that various changes may be made without departing from the scope of the disclosure, which is further described in the following appended claims.

What is claimed is:

1. A pelletized tire pyrolysis product, comprising:
a carbon black product in an amount greater than about 85 percent by weight relative to the total weight of the pelletized tire pyrolysis product, the carbon black product formed from a carbonaceous char derived from pyrolysis of at least one of whole tires and tire shreds, the whole tires and the tire shreds having steel belt wire and zinc from zinc oxide present in tire rubber compounds, the carbon black product further comprising:
   a carbon black in an amount between 65 percent and 95 percent,
   an organic volatile material in an amount between 5 percent and 15 percent in the form of residual polymer and hydrocarbons remaining at an end of the pyrolysis of the at least one of the whole tires and the tire shreds,
   an inorganic ash in an amount in an amount up to 15 percent, wherein all percentages are by weight relative to the total weight of the carbon black product; and
a binder oil that agglomerates the carbon black product into substantially free-flowing pellets, wherein the binder oil is derived from the pyrolysis of the at least one of the whole tires and the tire shreds and has an iron content and a zinc content,
wherein individual pellets of the pelletized carbon black product have an average diameter from about 0.125 inches to about 0.0625 inches,
wherein an ASTM D3191 standard styrene butadiene rubber formulation with the carbon black product has a tensile strength between 2800 psi and 3500 psi, and
wherein the carbon black product is pulverized to about a 325 mesh particle size, with 99.99% of the pulverized carbon black product able to pass through a 325 mesh screen, prior to combining the carbon black product with the binder oil into the substantially free-flowing pellets.

2. The pelletized tire pyrolysis product according to claim 1, wherein the carbon black is present in the carbon black product at 85 percent, the organic volatile material at 5 percent, and the inorganic ash at 10 percent, wherein all percentages are by weight relative to the total weight of the carbon black product.

3. The pelletized tire pyrolysis product according to claim 1, wherein the carbon black product is substantially metal-free.

4. The pelletized tire pyrolysis product according to claim 1, wherein the binder oil is present in an amount up to about 15 percent by weight relative to the total weight of the pelletized tire pyrolysis product.

5. The pelletized tire pyrolysis product according to claim 1, wherein the carbon black is present in the carbon black product in an amount between about 85 percent and about 95 percent, and the inorganic ash is present in the carbon black product in an amount between about 9 percent and about 12 percent, wherein all percentages are by weight relative to the total weight of the carbon black product.

6. The pelletized tire pyrolysis product according to claim 1, wherein the at least one of the whole tires and the tires shreds are pyrolyzed according to a time-temperature profile that does not exceed a temperature of 870° F.

7. The pelletized tire pyrolysis product according to claim 4, wherein the desired amount of binder oil is about 12.5 percent by weight in relation to the total weight of the pelletized carbon black product.

8. The pelletized tire pyrolysis product according to claim 1, wherein an average particle size of the pulverized carbon black product prior to pelletization is about five microns.

9. A pelletized tire pyrolysis product, comprising:
a carbon black product in an amount greater than about 85 percent by weight relative to the total weight of the pelletized tire pyrolysis product, the carbon black product formed from a carbonaceous char derived from pyrolysis of at least one of whole tires and tire shreds, the whole tires and the tire shreds having steel belt wire and zinc from zinc oxide present in tire rubber compounds, the carbon black product further comprising:
   a carbon black in an amount between 65 percent and 95 percent,
   an organic volatile material in an amount between 5 percent and 15 percent in the form of residual polymer and hydrocarbons remaining at an end of the pyrolysis of the at least one of the whole tires and the tire shreds,
   an inorganic ash in an amount in an amount up to 15 percent, wherein all percentages are by weight relative to the total weight of the carbon black product; and a binder oil that agglomerates the carbon black product into substantially free-flowing pellets, wherein the binder oil is derived from the pyrolysis of the at least one of the whole tires and the tire shreds and has an iron content and a zinc content, wherein an ASTM D3191 standard styrene butadiene rubber formulation with the carbon black product has a tensile strength between 2800 psi and 3500 psi.

* * * * *